Sept. 26, 1933.　　　　C. R. NIKLASON　　　　1,928,391
MOLD FOR SHAPING CONFECTIONS
Filed Sept. 12, 1932　　　2 Sheets-Sheet 2

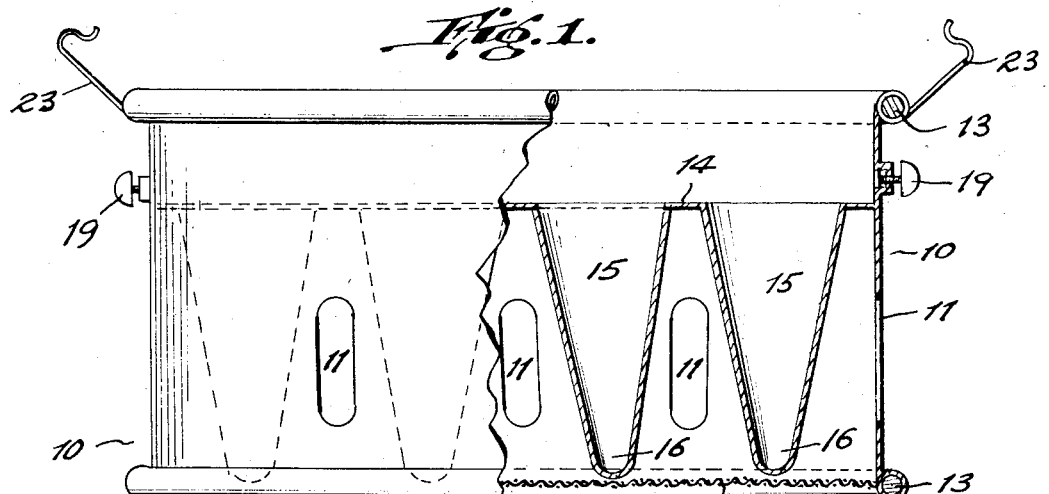
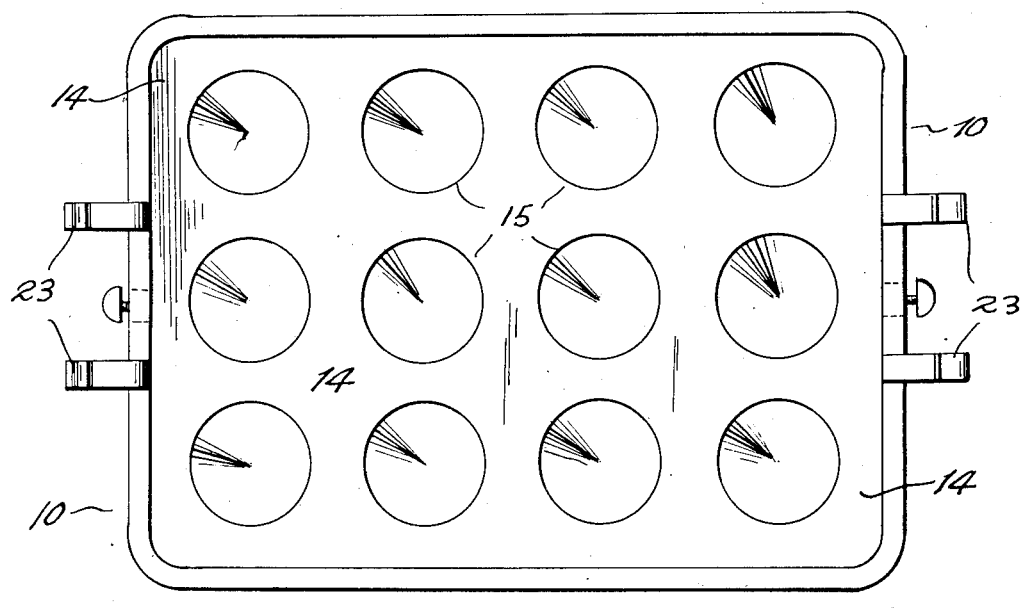
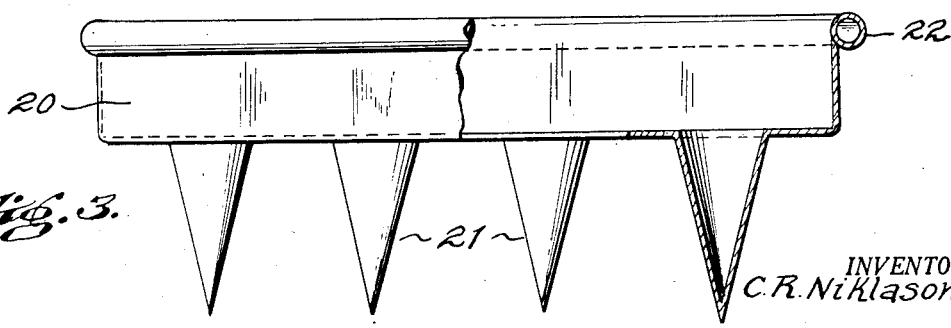

INVENTOR.
C. R. Niklason
BY J. T. Newton
ATTORNEYS.

Patented Sept. 26, 1933

1,928,391

UNITED STATES PATENT OFFICE 1,928,391

MOLD FOR SHAPING CONFECTIONS

Clarence R. Niklason, Cherrydale, Va.

Application September 12, 1932
Serial No. 632,842

4 Claims. (Cl. 107—1)

This invention relates to improvements in molds for shaping confections to impart thereto a conical shape for dispensing purposes. In one method for dispensing ice-cream, for an instance, edible containers are provided for holding individual portions of the confection. These containers are made of an edible crust-like material and are in the form of hollow cones with thin walls. These containers are made by a machine so as to have a uniform size and shape and are stacked in a carton suitable for easy handling. In serving an individual portion, in ordinary practice, one of the containers is filled with confection ladled from a bulk supply. In this operation the container, which is to be eaten, is handled by the salesman, which is objectionable for sanitary reasons. Furthermore, in filling the edible container, some of the confection projects over the edge of the holder, melts and runs down the sides of the container to soil the fingers of the person eating the confection. This contact of the fingers with the edible container is also objectionable. In filling a large number of containers, a considerable quantity of the confection is spilled in ladling.

The instant invention has for its object the provision of a device for molding, in a single operation, a large quantity of plastic confection, such as ice-cream, into a plurality of cones of uniform shape and size to fit the edible hollow cones, or containers, in common use and which are supplied to the trade in a uniform size and shape. By means of the device hereafter described, each confection cone is molded to fit an edible container, according to the usual practice, but that part of the confection cone above the container is given a substantially cylindrical shape so that it does not flare outwardly over the container edge to melt and run down the side of the container. Owing to the uniformity in the size and shape of the associated container and confection cone, uniform holders can be employed to enclose the product while it is being handled to prevent contamination. These holders are formed of waterproof sheet material, cone-shaped to fit over the lower part of the container. To serve a portion of the confection, one of the holders is first shifted over one of the containers and the latter is then pressed over the confection to be handed to the customer. Handled in this way, the edible part of the product does not come in contact with the fingers of either the salesman or the customer. Also, there is no waste in filling the edible container as it often occurs when the container is filled by the ordinary ladling method.

Another object of the invention is to provide a device that will mold in the conical confection a conical core that can be subsequently filled with a flavoring sirup. In the present device means are provided for taking care of the confection displaced by the formation of the conical core so that there will be no waste of the material. Also, the means employed are such that accurate measurement is not required of the material charged into the device preliminary to a molding operation, as any excess can be readily removed previous to the molding of the conical cores. The flavoring sirup is turned into the hollow core after the confection cone has been placed in the edible container and the latter enclosed by the protecting holder; consequently, the fingers do not come in contact with the edible part of the product during this filling operation.

The means employed for carrying out the invention are described in detail hereinafter, pointed out in the appended claims, and illustrated by the accompanying drawings.

In the accompanying drawings, in which similar reference characters designate corresponding parts, Figure 1 is a view, partly in elevation and partly in vertical section, showing the main receptacle.

Figure 2 is a plan view of the same.

Figure 3 is a view, partly in elevation and partly in vertical section, of the tray adapted to cooperate with the main receptacle.

Figure 4:
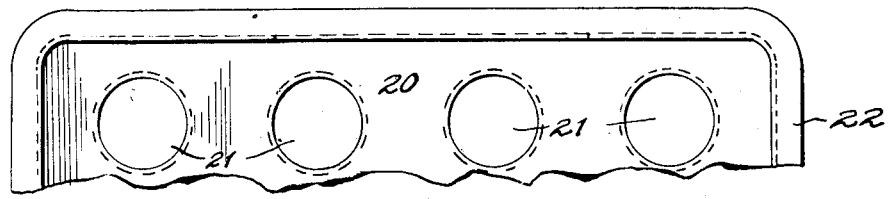
Figure 4 is a plan view of the tray, part being broken away.
Figure 5:
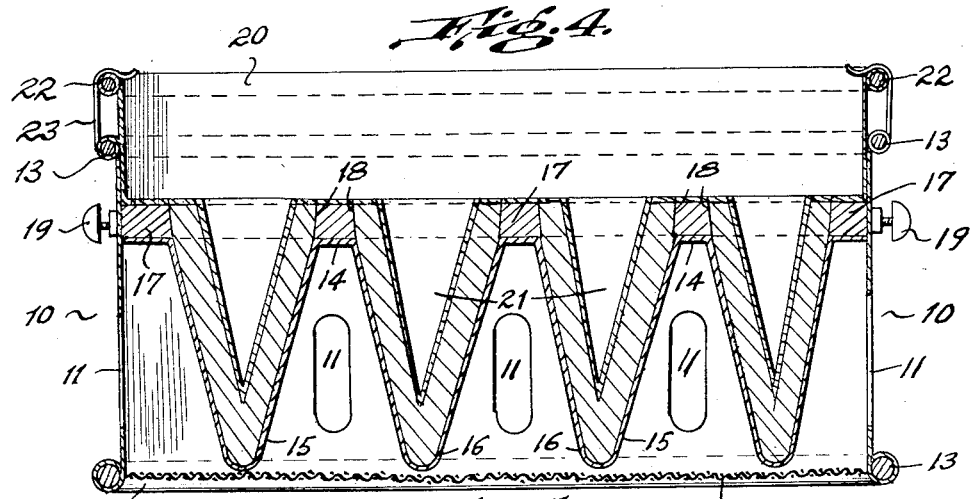
Figure 5 is a transverse vertical section of the device with the parts assembled, showing the molded confection in place.

Referring to the drawings in detail, 10 designates the main receptacle of a generally rectangular formation, with its sides formed of sheet metal, having ventilating openings 11 therein. It is open at the top and extending across its bottom is the screen 12. The upper and lower edges are beaded, as at 13, to reinforce the structure. Extending between the opposite walls of the receptacle, at an intermediate part thereof, is the horizontal diaphragm 14 fixed to the walls. Projecting downwardly from the diaphragm are the inverted conical molds 15 for molding the confection. The lower ends of the molds are slightly above the screen bottom of the receptacle and are rounded, as at 16, to facilitate the removal of the molded confections.

A spacer 17 is removably fitted in the upper part of the main receptacle 10 and is seated on the diaphragm 14 during the operation of the device. This spacer comprises a metal plate of considerable thickness and extending through the same is a plurality of circular openings 18 to register with the openings at the upper ends of the conical molds 15. The peripheral walls of the opening 18 continue in the same general direction as the contiguous walls of the conical molds, but are inclined less from the perpendicular. In opposite walls of the main receptacle are set-screws 19 for engaging the edges of the spacer to hold the latter in place.

A means is provided for forming conical cores within the confections contained in the conical molds 15. A shallow tray 20 is shaped to fit within the upper part of the main receptacle 10. Extending downward from the bottom of the tray is a plurality of hollow conical projections 21 positioned to pass through the openings 18 of the spacer 17 and to enter the conical molds 15 when the tray is seated in the main receptacle on top of the spacer. The cross-area of each of the conical projections 21 is considerably less than the cross-area of the associated conical mold, to provide an annular conical space between the two mold members. With the tray seated in the main receptacle on the spacer, the side walls of the tray extend a short distance above the walls of the main receptacle so that the tray can be easily grasped in handling the same. The upper edge of the tray is beaded, as at 22, to reinforce the same. On opposite edges of the main receptacle are hinged the catches 23 to be turned to engage the upper edges of the tray to hold the assembled parts of the device together.

In the operation of the device, the tray 20 and spacer 17 are first removed from the main receptacle 10 and then a quantity of the confection, ice-cream for an instance, is placed in the receptacle. By means of a suitable implement the confection is spread over the diaphragm 14 and is forced into the conical molds 15 until all of the latter are completely filled. The residue of the confection is scraped clear of the diaphragm so that the material in the molds is flush with the diaphragm. The spacer is then seated in the main receptacle on top of the diaphragm and is locked in place by the set-screws 19. With the spacer in position, the openings 18 therein provide circular recesses immediately above the segregated confections contained in the conical molds 15. The tray 20 is then placed in the upper part of the main receptacle and is pressed down onto the spacer and the conical projections 21 are forced through the openings 18 of the spacer into the confections contained in the conical molds. The plastic confection material displaced by the conical projections is forced into the annular recesses between the upper parts of the projections and the walls of the openings 18 in the spacer. In the formation of the related parts, the capacity of each annular recess is gauged to contain all of the excess material displaced from the adjacent conical mold by the conical projections forced therein. The device having been loaded, the catches 23 are turned to engage the upper edge of the tray to hold the parts firmly together. The loaded device is placed in a refrigerator to harden the molded confection. If an ordinary ice-box is used, a mixture of crushed ice and salt is packed in the tray of the mold to accelerate the refrigeration. As the joints of the several parts are water-tight, the brine cannot leak into the receptacle to contact with the confections. The loaded device can be immersed in a chilled brine to harden the confections. The screen bottom and the openings in the sides of the main receptacle permit a free circulation of the chilling fluid around the conical molds. The screen bottom also protects the conical molds during the handling of the device.

After the confection cones become hardened, the receptacle is taken from the refrigerator and the cones are removed for dispensing purposes and so that the device can be reloaded. After the catches 23 are released, the tray is removed from the main receptacle. Before the tray is lifted, warm water may be turned into the same to thaw the confection adhering to the same. With the tray removed, the main receptacle is turned with its upper side down onto a platter (not shown) that enters the receptacle to abut the spacer. If the confection cones are frozen to the molds, they are soon loosened by the contact of the warm air acting on the metal of the molds to thaw the adhering confection. After the loosening of the confection cones, the main receptacle is lifted from the platter, on which the cones remain. The platter with the cones can then be placed in a cool place for dispensing purposes. After the cones have been removed, by turning the thumb-screws 19 the spacer can be removed preliminary to reloading the device.

Figures 6, 9:
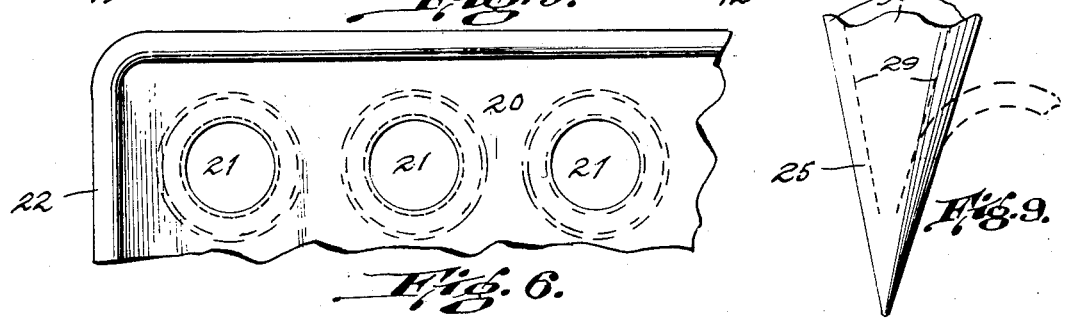
Figure 6 is a plan view, with part broken away, of the device with the parts assembled, as shown in Fig. 5.
Figure 9 is an elevation of the paper holder for the confection.

In dispensing the cones, for sanitary reasons, the fingers should not come in contact with the confections. To this end a holder is provided to contain the cone. As shown in Fig. 9, the holder 25 is formed of liquid-impervious material, such as paraffine paper, shaped to fit the exterior of a cone. A holder is seized by the fingers and is placed over the crust-like container 26 (Fig. 10) and the latter is placed over the confection cone 27. The three members fit in tight nested relation so that they stick together and the confection cone can be lifted from the platter. The cone is then held upright and its hollow core filled with the flavoring sirup 28. In this way the cone can be dispensed without the edible parts being touched by the hands. Extending longitudinally of the holder 25 are the slits 29 so that the holder can be readily stripped from the confection as it is being eaten. The edges of the holder are scalloped, as at 30, so that its parts can be readily grasped to strip the same.

Figures 7, 10:
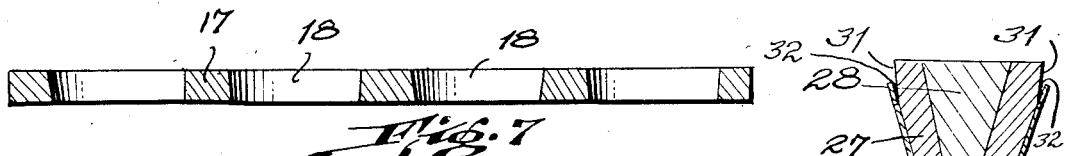
Figure 7 is a sectional view of the spacer.
Figure 10 is a vertical section of the confection ready for dispensing.
Figure 8:
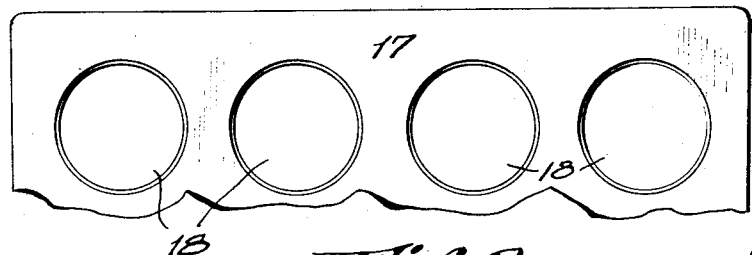
Figure 8 is a plan view of the spacer, partly broken away.

In the completed product, as shown by Fig. 10, the paper holder 25 extends over the lower part of the edible container 26 and the upper part of the confection projects above the edible container. The upper part of the confection is shaped by the wall of the opening 18 of the spacer so that the sides of the upper part, as at 31, are inclined inwardly from the general direction of the sides of the lower part of the conical confection. The upper part of the edible container 26 projects a short distance over the inclined sides 31 to provide a groove or lip, as at 32, to catch the drip from the melting confection.

What I claim is:—

1. In a device for molding confection cones, the combination of a main receptacle having a diaphragm extending horizontally between intermediate parts of the side walls of the receptacle, said receptacle having openings in its walls below the diaphragm to permit the passage of air through the receptacle below the diaphragm, inverted conical molds projecting downward from the diaphragm and opening through the diaphragm into the upper part of the receptacle, a screen extending across the bottom of the receptacle below the conical molds, and a tray adapted to fit within the upper part of the main receptacle above the diaphragm and having conical projections extending from its bottom to enter the conical molds, the cross-area of each conical projection being less than the cross-area of the adjacent conical mold to provide an annular conical space between the mold and the projection.

2. In a device for molding confection cones, the combination of a main receptacle having a diaphragm extending horizontally between the side walls of the receptacle, inverted conical molds projecting downward from the diaphragm and opening through the diaphragm into the upper part of the receptacle, a spacer adapted to seat on the diaphragm and having circular openings to register with the openings of the conical molds, and a tray adapted to seat in the main receptacle on the spacer and having conical projections extending from its bottom to pass through the openings of the spacer and to enter the conical molds, the cross-area of each conical projection being less than the cross-area of the adjacent conical mold to provide an annular conical space between the mold and the projection and with said annular space communicating with the adjacent circular opening of the spacer.

3. In a device for molding confection cones, the combination of a main receptacle having a diaphragm extending horizontally between the side walls of the receptacle, inverted conical molds projecting downward from the diaphragm and opening through the diaphragm into the upper part of the receptacle, a spacer adapted to seat on the diaphragm and having circular openings to register with the openings of the conical molds, said openings of the spacer having their walls inclined inwardly from the general direction of the walls of the corresponding conical molds, and a tray adapted to seat in the main receptacle on the spacer and having conical projections extending from its bottom to pass through the openings of the spacer and to enter the conical molds, the cross-area of each conical projection being less than the cross-area of the adjacent spacer opening and of the adjacent conical mold to provide an annular conical space between the mold and the conical projection and also providing an annular recess between the conical projection and the opposite wall of the spacer opening with said annular conical space communicating with said annular recess.

4. The method of molding hollow confection cones, comprising completely filling a mold with a plastic confection in a quantity sufficient to form the complete cone, thereafter increasing the capacity of the mold, and subsequently forming the hollow in the cone by displacing the core of the contained confection to fill the mold to its increased capacity.

CLARENCE R. NIKLASON.